US010536265B2

(12) United States Patent
Tong

(10) Patent No.: US 10,536,265 B2
(45) Date of Patent: Jan. 14, 2020

(54) METHOD, SYSTEM AND APPARATUS FOR DATA STORAGE AND DATA ACCESS

(71) Applicant: Alibaba Group Holding Limited, George Town (KY)

(72) Inventor: Jun Tong, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/422,641

(22) Filed: May 24, 2019

(65) Prior Publication Data
US 2019/0280855 A1 Sep. 12, 2019

Related U.S. Application Data

(63) Continuation of application No. PCT/CN2017/111538, filed on Nov. 17, 2017.

(30) Foreign Application Priority Data

Nov. 24, 2016 (CN) .......................... 2016 1 1050311

(51) Int. Cl.
H04L 29/06 (2006.01)
H04L 9/06 (2006.01)
(Continued)

(52) U.S. Cl.
CPC .......... *H04L 9/0637* (2013.01); *G06F 16/245* (2019.01); *G06F 21/602* (2013.01);
(Continued)

(58) Field of Classification Search
CPC ... H04L 9/0637; H04L 9/3073; H04L 9/3297; H04L 2209/38; G06F 21/602; G06F 16/245
See application file for complete search history.

(56) References Cited

U.S. PATENT DOCUMENTS 9,774,578 B1 * 9/2017 Ateniese ............... G06F 3/0619
9,785,369 B1 * 10/2017 Ateniese ............... G06F 3/0619
(Continued)

FOREIGN PATENT DOCUMENTS

CN 105959119 9/2016
CN 105975868 9/2016
(Continued)

OTHER PUBLICATIONS

International Preliminary Report on Patentability in International Application No. PCT/CN2017/111538, dated May 28, 2019, 10 pages (with English Translation).
(Continued)

Primary Examiner — John B King
(74) Attorney, Agent, or Firm — Fish & Richardson P.C.

(57) ABSTRACT

The present application discloses methods and systems to receive a data storage instruction including data to be stored and an identifier of the data; identify a blockchain corresponding to the identifier, the blockchain stored on blockchain network storage nodes of a data access system; identify a key pair corresponding to the identifier, the key pair comprising a private key and a public key; encrypting the data based on the public key to provide encrypted data; updating the blockchain by storing the encrypted data in the blockchain; and storing the updated blockchain in a particular blockchain network storage node of the blockchain network storage nodes, the particular blockchain network storage node associated with a data storage device.

16 Claims, 7 Drawing Sheets

(51) Int. Cl.
  *G06F 16/245* (2019.01)
  *G06F 21/60* (2013.01)
  *H04L 9/30* (2006.01)
  *H04L 9/32* (2006.01)
  *G06F 21/62* (2013.01)

(52) U.S. Cl.
  CPC ........ *G06F 21/6227* (2013.01); *H04L 9/3073* (2013.01); *H04L 9/3297* (2013.01); *H04L 2209/38* (2013.01)

(56) References Cited

U.S. PATENT DOCUMENTS

| | | | |
|---|---|---|---|
| 9,898,782 B1* | 2/2018 | Winklevoss | G06Q 40/04 |
| 9,959,065 B2* | 5/2018 | Ateniese | G06F 3/0619 |
| 9,967,088 B2* | 5/2018 | Ateniese | G06F 3/0619 |
| 9,967,096 B2* | 5/2018 | Ateniese | G06F 3/0619 |
| 10,046,228 B2* | 8/2018 | Tran | A61B 5/0022 |
| 10,110,576 B2* | 10/2018 | Ateniese | G06F 3/0619 |
| 10,158,480 B1* | 12/2018 | Winklevoss | H04L 9/3239 |
| 10,305,875 B1* | 5/2019 | Ateniese | G06F 3/0619 |
| 10,348,707 B2* | 7/2019 | Ateniese | G06F 3/0619 |
| 10,356,066 B2* | 7/2019 | Ateniese | G06F 3/0619 |
| 2016/0283920 A1* | 9/2016 | Fisher | G06Q 20/02 |
| 2016/0292672 A1 | 10/2016 | Fay et al. | |
| 2016/0306982 A1 | 10/2016 | Seger, II et al. | |
| 2016/0328713 A1 | 11/2016 | Ebrahimi | |
| 2017/0031676 A1* | 2/2017 | Cecchetti | G06F 8/65 |
| 2017/0116693 A1* | 4/2017 | Rae | G06F 21/64 |
| 2017/0243193 A1* | 8/2017 | Manian | G06Q 20/3829 |
| 2017/0344435 A1* | 11/2017 | Davis | G06F 11/1464 |
| 2017/0364699 A1* | 12/2017 | Goldfarb | H04L 9/3239 |
| 2017/0366348 A1* | 12/2017 | Weimer | H04L 9/3247 |
| 2018/0114220 A1* | 4/2018 | Ekberg | G06Q 20/3829 |
| 2018/0115416 A1* | 4/2018 | Diehl | H04L 9/0819 |
| 2018/0144292 A1* | 5/2018 | Mattingly | G06F 16/903 |
| 2018/0205555 A1* | 7/2018 | Watanabe | G06Q 10/06 |
| 2018/0253702 A1* | 9/2018 | Dowding | G06Q 20/06 |
| 2018/0343114 A1* | 11/2018 | Ben-Ari | H04L 9/0825 |
| 2018/0343238 A1* | 11/2018 | Tola | H04L 67/12 |
| 2019/0075020 A1* | 3/2019 | Leal Monteiro | H04L 41/0806 |
| 2019/0111255 A1* | 4/2019 | Errico | A61N 1/36014 |
| 2019/0138726 A1* | 5/2019 | Leal Monteiro | G06F 21/567 |

FOREIGN PATENT DOCUMENTS

| | | |
|---|---|---|
| CN | 106055993 | 10/2016 |
| CN | 106096444 | 11/2016 |
| CN | 106097073 | 11/2016 |
| CN | 106100847 | 11/2016 |
| CN | 106130779 | 11/2016 |
| CN | 106991334 | 7/2017 |

OTHER PUBLICATIONS

International Search Report and Written Opinion in International Application No. PCT/CN2017/111538, dated Feb. 26, 2018, 15 pages (with English Translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Patent Application No. 17873246.7, dated Oct. 15, 2019, 9 pages.

* cited by examiner

METHOD, SYSTEM AND APPARATUS FOR
DATA STORAGE AND DATA ACCESS

CROSS-REFERENCE TO RELATED APPLICATIONS

This application is a continuation of PCT Application No. PCT/CN2017/111538, filed on Nov. 17, 2017, which claims priority to Chinese Patent Application No. 201611050311.4, filed on Nov. 24, 2016, and each application is hereby incorporated by reference in its entirety.

TECHNICAL FIELD

The present application relates to the field of information technologies, and in particular, to a method, system and apparatus for data access.

BACKGROUND

With the development of information technologies and the widespread popularity of digital office, many industries generate a large amount of data that needs to be stored every day. Therefore, the data storage technology has become one of the public focuses.

A general solution in the existing data storage technology is to implement data storage by using a database technology. That is, one or more devices that store data are managed by using one database management center, and create, retrieve, update, and delete (CRUD) operations performed on data are managed by using the database management center. With the continuous development of existing data storage technologies, new data storage technologies such as a distributed database technology are gradually developed and perfected. As such, data storage is significantly improved not only in terms of a storage speed, data occupation space, but also in terms of data management convenience, etc., so as to satisfy people's demands for data storage.

However, in the existing technology, databases used by different enterprises or units usually run independently, and are separately managed by respective database management centers. When data separately stored by a plurality of enterprises or units needs to be obtained, corresponding data needs to be obtained separately from different databases, and a data acquisition process is consequently complex.

In addition, considering the security of the data, usually, not databases of all enterprises or units are publicly accessible. Consequently, it is difficult to obtain related data successfully over the network. In addition, usually, before obtaining data, an identity needs to be first proved (or a digital certificate needs to be obtained) in a qualified department, so as to obtain the data from the enterprise or the unit by using the identity information (or the digital certificate) that has already been proved. Consequently, it becomes harder to obtain the data.

SUMMARY

Implementations of the present application provide a data storage and query method, apparatus, and system, to alleviate an issue of complex operations of obtaining data from multiple databases and low efficiency resulting from storing data in different databases that are independent of each other in an existing data storage technology.

The following technical solutions are adopted in the implementations of the present application.

A data storage method is provided, including the following: determining a data storage instruction, where the data storage instruction carries an identifier and data to be stored; determining a blockchain that corresponds to the identifier and a key pair that corresponds to the identifier based on the identifier; and storing the data to be stored in the blockchain based on the key pair.

A data query method is provided, including the following: determining a data query instruction, where the data query instruction carries an identifier; determining a blockchain that corresponds to the identifier and a private key that corresponds to the identifier based on the identifier; and performing a query after decrypting data in the blockchain based on the private key.

A data access system is provided, including several storage devices, several query devices, and several blockchain network storage nodes, where the blockchain network storage node is configured to store a blockchain that corresponds to an identifier; the storage device is configured to determine a data storage instruction, determine the blockchain that corresponds to the identifier and a key pair that corresponds to the identifier based on the identifier carried in the data storage instruction, and store data to be stored in the blockchain that corresponds to the identifier in the blockchain network storage node based on the key pair; and the query device is configured to determine a data query instruction, determine a blockchain that corresponds to the identifier and a private key that corresponds to the identifier based on an identifier carried in the data query instruction, decrypt data in the blockchain by using the private key, and perform a query.

A data storage apparatus is provided, including the following: a first determining module, configured to determine a data storage instruction, where the data storage instruction carries an identifier and data to be stored; a second determining module, configured to determine a blockchain that corresponds to the identifier and a key pair that corresponds to the identifier based on the identifier; and a storage module, configured to store the data to be stored in the blockchain based on the key pair.

A data query apparatus is provided, where the apparatus includes a vibration motor and a sensor, and includes the following: a first determining module, configured to determine a data query instruction, where the data query instruction carries an identifier; a second determining module, configured to determine a blockchain that corresponds to the identifier and a private key that corresponds to the identifier based on the identifier; and a query module, configured to perform a query after decrypting data in the blockchain based on the private key.

At least one of the previously described technical solutions used in the implementations of the present application can achieve the following beneficial effects: During a data storage process, the data storage instruction is first determined; then the blockchain and the key pair that correspond to the identifier are determined based on the identifier carried in the data storage instruction; finally, the data to be stored is stored in the blockchain based on the key pair. During a data query process, the data query instruction is first determined; then the blockchain and the private key that correspond to the identifier are determined based on the identifier that corresponds to the data query instruction; finally, a query is performed after the data in the blockchain is decrypted based on the private key. It can be seen that, according to the method provided in the implementations of the present application, for accessing data that corresponds to the identifier, there is no need to access a plurality of databases but only access the blockchain that corresponds to the identifier. Meanwhile, data can be stored only by using the key pair. As such, data security is ensured, operation complexity can be lowered, and data access efficiency can be improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations and accompanying drawings of the present application. The described implementations are merely some rather than all of the implementations of the present application. All other implementations obtained by a person of ordinary skill in the art based on the implementations of the present application without creative efforts shall fall within the protection scope of the present application.

The present application relates to a blockchain technology. Before describing the implementations of the present application in detail, a concept of a blockchain is first properly described. A "block" of a "blockchain" is a basic unit that forms a blockchain. The block can include two parts: a block header and a block body. The block header can include at least three types of information, that is, identification information (for example, a hash value) of the current block, identification information of a previous block of the current block, a time stamp, etc. Because one block includes identification information of a previous block, a plurality of blocks can form a chain, and further form a blockchain network. The blockchain has many excellent features as described below. Decentralization: Due to the use of distributed ledger and storage, there is no centralized hardware or management organization, and the rights and obligations of the nodes are equal; the data blocks in the system are jointly maintained by the nodes with maintenance functions in the entire system. Autonomy: The blockchain adopts consensus-based specifications and protocols (such as a set of open and transparent algorithms) to enable all nodes in the entire system to freely and securely exchange data in an untrusted environment. As such, trust in "people" becomes trust in machines, and there is no human intervention. Non-tampering: Once the information has been verified and added to the blockchain, the information is stored permanently. Unless more than 51% of the nodes in the system can be controlled at the same time, the modification to the database is invalid. Therefore, the data stability and reliability of the blockchain are very high.

The technical solutions provided in the implementations of the present application are described in detail below with reference to the accompanying drawings.

Figure 1:
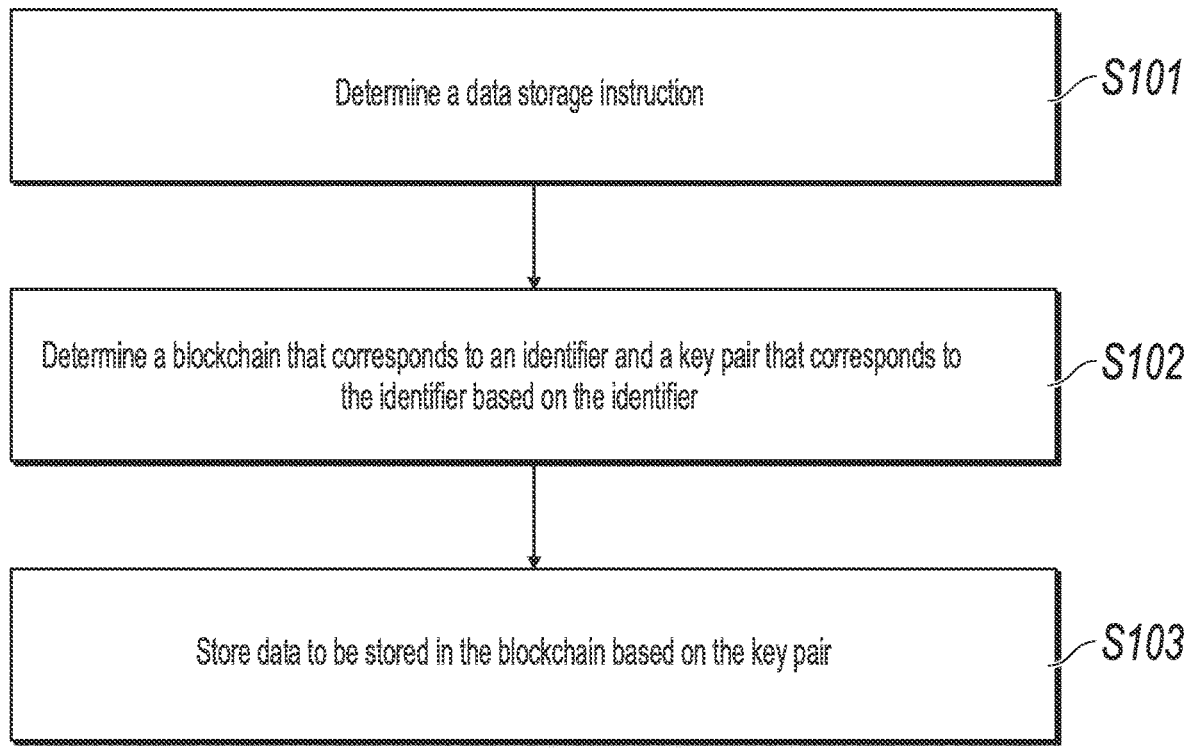
FIG. 1 illustrates a data storage process, according to an implementation of the present application.

FIG. 1 illustrates a data storage process, according to an implementation of the present application. The process includes the following steps.

S101: Determine a Data Storage Instruction.

Usually, in a data storage process, a data storage device can store data to be stored in a specified storage device based on a data storage instruction. For example, when storing data in a database, the data storage device can store the data in the device of a database based on a received data storage instruction. The device here can be a single device, or can be a system that includes a plurality of devices. The device can be a mobile phone, a personal computer, a tablet computer, a server, etc. The device is not limited in the present application. In this implementation of the present application, a data query method and apparatus are further provided. For ease of description (but not for limitation), subsequently, devices that execute a data storage process are referred to as a storage device.

Because the storage device can be configured to execute a data storage process, the storage device can determine a data storage instruction. The data storage instruction can be generated by the storage device or can be received by the storage device. The source of the data storage instruction is not limited in the present application, provided that the storage device can determine the data storage instruction. In this implementation of the present application, the data storage instruction can carry an identifier and data to be stored. That is, when determining the data storage instruction, the storage device can determine the identifier carried in the data storage instruction and the data that needs to be stored by using the data storage instruction. The identifier can be an identity card number of a citizen, an account identifier, a mailbox identifier, etc. The identifier is not limited in the present application provided that the identifier is a globally unique identifier. For ease of subsequent description, the following gives a description by using an example that an identifier is an identity card number of a citizen.

S102: Determine a Blockchain that Corresponds to an Identifier and a Key Pair that Corresponds to the Identifier Based on the Identifier.

In this implementation of the present application, after the storage device determines the data storage instruction, because the storage device can further determine the identifier carried in the data storage instruction and the data to be stored, the storage device can further determine the blockchain that corresponds to the identifier and the key pair that corresponds to the identifier based on the identifier. In a subsequent data storage process, the data to be stored determined in step S101 is stored in the blockchain.

In this implementation of the present application, "a blockchain that corresponds to an identifier" indicates a relationship between an identifier and a blockchain. In an application process, the identifier can be classified into at least two types based on a characteristic of the identifier: a subject-specific identifier and a transaction-specific identifier, and different types of identifiers can correspond to different blockchains. For the former, different subjects (for example, person A and person B) can correspond to different blockchains, and for the latter, different transactions (for example, registration transactions for book purchasing and reunion transactions) can correspond to different blockchains. The following separately describes an identifier and a corresponding blockchain by using examples.

Assume that a blockchain technology is used for personal file storage. The personal file usually includes a plurality of types of information, and the information comes from records in different government departments or related institutions. For example, for person A, the file information can include household registration information that is recorded by a police department, marital status information that is recorded by a civil affairs department and formed based on a marital status of A, loan information that is recorded by a bank and formed based on a personal loan of A, and employment information that is recorded by an employer and formed based on a personal employment relationship of A. The information is formed in different periods, and can be stored in one blockchain by using the blockchain technology. Therefore, the blockchain is a blockchain dedicated to (or corresponding to) person A. Likewise, for person B, there can be a blockchain that stores a personal file of B. Accordingly, there can be massive blockchains that are formed due to different identities of persons. In this way, because a plurality of blockchains can coexist in a network formed by a plurality of blockchain network storage nodes, to write personal file information newly generated by a subject into an existing blockchain of the subject, a blockchain that corresponds to the subject needs to be first determined (identified) based on an identifier of the subject. This type of identifier is a subject-specific identifier.

In an example, registration transactions for book purchasing may need to be performed in a WECHAT group using the blockchain technology. The first person who initiates a registration activity to book A sends the serial number and name (1, name 1) to the WECHAT group; the second person who also wants to purchase book A adds personal information to the information of the first person and sends the information (1, name 1; 2, name 2) to the WECHAT group; and so on. This entire process forms a blockchain (blockchain A) for purchasing book A. However, in the WECHAT group, there can also be a registration activity to book B (or other transactions such as organizing a dinner party). The first person who initiates a registration activity to book B can send the serial number and name to the WECHAT group, and so on, to form a blockchain (blockchain B) for purchasing book B. When two or more blockchains coexist in one WECHAT group, a person who needs to add information to the chain needs to identify a corresponding blockchain. For example, a person who wants to purchase book A needs to identify blockchain A, and a person who wants to purchase book B needs to identify blockchain B. In this way, because a plurality of blockchains can coexist in a network formed by a plurality of blockchain network storage nodes (similar to a device of a group member in a WECHAT group), to write transaction update information generated for a transaction into an existing blockchain of the transaction, a blockchain that corresponds to the transaction needs to be first determined (identified) based on an identity of the transaction. This type of identifier is a transaction-specific identifier.

In some implementations of the present application, the blockchain that corresponds to the identifier can be a consortium blockchain, that is, not all end-user devices have permission to perform a data storage operation on the blockchain, and only a specified end-user device has permission to perform a data storage operation on the blockchain, to ensure data security and data authenticity in the blockchain during a data storage process. In some implementations of the present application, the blockchain can be a public blockchain, a private blockchain, etc. It is worthwhile to note that a way of determining the specified end-user device here in an actual process is related to factors such as a characteristic of a blockchain. The way is not limited in the present application. For example, in the previous (i.e., above-described) implementation of the present application, the blockchain is a consortium blockchain, and the specified end-user device can be determined by the consortium. On this basis, in the previous implementation of the present application, a storage device that performs step S101, step S102, and a subsequent data storage process can be the specified end-user device, that is, an end-user device that has permission to store data in the blockchain.

In this implementation of the present application, the storage device can determine whether a blockchain that corresponds to the identifier exists in the blockchain network storage node based on the identifier determined in step S101 and a pre-stored mapping relationship between the identifier and each of the key pair and the blockchain. If there are a plurality of blockchain network storage nodes, the storage device can determine a blockchain that corresponds to the identifier by searching at least one blockchain network storage node. Here, a mapping relationship between the identifier and the blockchain can be stored in the storage device, or can be stored in each node in a network formed by blockchain network storage nodes, or can even be stored in a third-party device. In practice, a storage location of the mapping relationship can be considered from the perspective of reading convenience, a read speed, security, etc. For example, the mapping relationship between an identifier and a blockchain can be stored locally in the storage device, so that it can be more convenient for reading and writing. Likewise, a mapping relationship between the identifier and the key pair can be stored in a place based on an actual situation. In addition, it is worthwhile to further note that the blockchain network storage node and the storage device here can be the same device, or can be different devices. Implementations are not limited in the present application. To ensure data security, usually, there can be a plurality of blockchain network storage nodes in the blockchain technology. As such, the blockchain can be stored in the plurality of blockchain network storage nodes. When one blockchain network storage node is faulty (for example, a breakdown or a data loss occurs), any other blockchain network storage node that is not faulty can replace the node to work, and the faulty blockchain network storage node can be restored based on data stored in the blockchain network storage node that is not faulty (that is, data stored in the blockchain).

After determining that a blockchain corresponding to the identifier exists, the key pair that corresponds to the identifier can be further determined. If the blockchain that corresponds to the identifier does not exist, the blockchain that corresponds to the identifier and the key pair that corresponds to the identifier are generated. Details are as follows.

When the blockchain exists, in the present application, because the storage device can be specified, the storage device can further pre-store the key pair that corresponds to the identifier, and the storage device can determine the blockchain that corresponds to the identifier and the key pair that corresponds to the identifier. The determined blockchain stores an encrypted data packet that corresponds to the identifier, the key pair can be used to decrypt and encrypt the encrypted data packet that corresponds to the identifier, and the storage device determines the blockchain and the key pair to proceed with a subsequent data storage process. It is worthwhile to note that, when the blockchain that corresponds to the identifier exists, during a process of determining the key pair, the storage device can also send a request for obtaining the key pair that corresponds to the identifier to another specified device, where the request can carry an identifier of the storage device, so that the another specified device determines that the storage device also belongs to the specified device and has permission to obtain the key pair, and the key pair is returned so that the storage device can obtain the key pair. It is worthwhile to note that, when determining the key pair, the storage device can also use different methods based on actual demands in practice. Implementations are not limited in the present application.

When a blockchain that corresponds to the identifier does not exist, the storage device can generate a blockchain that corresponds to the identifier and a key pair that corresponds to the identifier. The generated blockchain is used to store data that corresponds to the identifier, and to ensure data security, the data can be an encrypted data packet that is obtained after a packaging and encryption operation, that is, the blockchain can store an encrypted data packet that corresponds to the identifier. The key pair can be used to enable a specified device to store data in the blockchain, that is, the key pair can be used to decrypt and encrypt an encrypted data packet that corresponds to the identifier, so that the specified device can store data in the blockchain.

S103: Store Data to be Stored in the Blockchain Based on the Key Pair.

In this implementation of the present application, after the storage device determines the blockchain that corresponds to the identifier and the key pair that corresponds to the identifier, the storage device can store the data to be stored carried in the data storage instruction in the blockchain, to complete the data storage process.

In step S102, a case that the storage device determines the blockchain and a case that the storage device determines the key pair are different, as described below:

Case 1: When determining that a blockchain that corresponds to the identifier exists, the storage device can perform the following steps. The storage device can first retrieve, from the blockchain network storage node, an encrypted data packet that corresponds to the identifier in the blockchain. Next, the storage device can decrypt the encrypted data packet by using a private key in the key pair to obtain all data that corresponds to the identifier in the encrypted data packet. Then, the storage device can update all the data based on the data to be stored, to obtain updated data that corresponds to the identifier. Finally, the storage device can encrypt the updated data as an updated encrypted data packet by using a public key in the key pair, and after adding a time stamp to the updated encrypted data packet, store the updated encrypted data packet and the time stamp in the blockchain, and store, in the blockchain network storage node, the blockchain that stores the updated encrypted data packet and the time stamp. After all the previous data that corresponds to the identifier is updated to obtain the updated data, the updated data becomes all data that corresponds to the identifier. It is worthwhile to note that, because the blockchain technology is used in the present application, when the blockchain is stored in the blockchain network storage node, the blockchain network storage node can broadcast the blockchain to another blockchain network storage node, so that the current blockchain stored in all the blockchain network storage nodes is the same.

Case 2: When the storage device determines that a blockchain that corresponds to the identifier does not exist, the storage device can generate a blockchain that corresponds to the identifier and a key pair that corresponds to the identifier, and can perform the following specific steps. The storage device can first generate initial data that corresponds to the identifier based on the identifier; update the initial data based on the data to be stored to updated data; generate the key pair that corresponds to the identifier, and encrypt the updated data as an encrypted data packet that corresponds to the identifier by using a public key in the key pair; generate the blockchain that corresponds to the identifier, and store the encrypted data packet in the blockchain; and store, in the blockchain network storage node, the blockchain that stores the updated encrypted data packet. A specific type of data included in the initial data of the identifier is not limited in the present application, and can be determined based on demands during an actual use process.

In addition, in the present application, the data to be stored is stored in the most recently generated data block in the blockchain. Further, after determining the blockchain, the storage device can determine the most recently generated data block based on a generation time of each data block in the blockchain. In addition, because one data block can store a plurality of encrypted data packets that correspond to the identifier, in the present application, the storage device can further determine the most recently stored encrypted data packet based on a time stamp carried in each encrypted data packet, as an encrypted data packet that corresponds to the identifier.

Further, because when the storage device stores the data to be stored, the data is updated after the encrypted data packet that corresponds to the identifier is retrieved, the storage device can add all the data that corresponds to the identifier to the encrypted data packet stored in the blockchain. That is, each updated encrypted data packet includes all data that corresponds to the identifier, so that when retrieving the encrypted data packet based on a time stamp, a device that retrieves the encrypted data packet can obtain all data that corresponds to the identifier, and no other data needs to be retrieved.

Still further, when generating the key pair that corresponds to the identifier, the storage device can further send the key pair and the identifier to each predetermined device. The storage device can send the key pair and the identifier to each device based on a predetermined address of each device. The predetermined devices can be specified devices, that is, devices that have permission to perform data storage on a blockchain that corresponds to the identifier.

It is worthwhile to note that, in the present application, the blockchain is stored in the blockchain network storage node, where each blockchain network storage node can be a system that includes one device or a plurality of devices, and is configured to store the blockchain. The blockchain stores an encrypted data packet that corresponds to the identifier, the blockchain can be stored in different blockchain network storage nodes, and the blockchain in the different blockchain network storage nodes is consistent. The blockchain and the blockchain network storage node are different concepts, and need to be understood differently.

According to the data storage method shown in FIG. 1, the data to be stored is stored in a blockchain that corresponds to the identifier, so that all data that corresponds to the identifier can be stored in the data chain, and when data that corresponds to the identifier are stored in different storage devices, (different parts of) the data does not need to be repeatedly retrieved, thereby improving efficiency of data storage and a data query. In addition, according to the consortium blockchain technology method, only a specified storage device has permission to store data that corresponds to the identifier. In addition, based on a characteristic of the blockchain technology, any operation performed on the data that corresponds to the identifier is recorded in the blockchain, so that security of the data that corresponds to the identifier is ensured, and a possibility of tracing a change of data that corresponds to the identifier is also improved.

In addition, the storage device can determine the key pair that corresponds to the identifier in step S102, so that the storage device can decrypt the retrieved encrypted data packet that corresponds to the identifier, and obtain all the data that corresponds to the identifier. Then, the storage device further needs to encrypt the updated data based on the key pair to store the encrypted data packet that corresponds to the identifier in the blockchain. As such, only the storage device that has the key pair that corresponds to the identifier can store the data in the blockchain, and in the present application, only the specified device can obtain the key pair, and it ensures security of the data in the blockchain.

Further, in the present application, to ensure security of storing data in the blockchain, when retrieving the data in the blockchain, the storage device can retrieve only the encrypted data packet in the blockchain, and determine that only data obtained after encryption performed by using the private key in the key pair is credible and secure.

Still further, in the present application, all data that corresponds to the identifier can be stored in a blockchain that corresponds to the identifier. However, in the consortium blockchain network, different specified devices can be configured to store different data that corresponds to the identifier. For example, the identifier can correspond to basic data (for example, a user attribute or a user type), or can correspond to account data (for example, an account balance or an account type), or can correspond to operation habit information (for example, historical behavior data). It can be seen that the basic data can be maintained by a device responsible for basic information that corresponds to the identifier (for example, a user center), and the account data can be maintained by a device responsible for keeping the accounts, and the operation habit data can be maintained by an advertisement pushing device. That is, in the present application, different devices can maintain data of different types that corresponds to the identifier.

Different key pairs can be stored at different specified devices in the consortium blockchain network, where different key pairs include the same private key, used to decrypt encrypted data packets that correspond to the identifier. However, different key pairs include different public keys, and different public keys can be used to encrypt only data of a specified type, so that devices that have different key pairs can store only data of a specified type. The configuration of the key pair can be determined by the staff. A specific configuration method is omitted for simplicity in the present application, provided that the key pair enables different devices to have permission to perform data encryption on data of different types.

For example, device A, device B, and device C respectively have different key pairs X, Y, and Z, and the key pairs X, Y, and Z can be used to encrypt x-type, y-type, and z-type data in all data that corresponds to identifier a, as shown in Table 1.

TABLE 1

| Device | Key pair | Data type |
| --- | --- | --- |
| Device A | Key pair X | x-type data |
| Device B | Key pair Y | y-type data |
| Device C | Key pair Z | z-type data |

The x-type, y-type, and z-type data include all data that corresponds to identifier a. Therefore, devices A, B, and C can store only a part of the data that corresponds to identifier a by using different key pairs. It improves security during a data storage process and reduces a probability of performing a misoperation on the data that corresponds to the identifier.

It is worthwhile to note that all the steps of the method provided in the implementations of the present application can be performed by the same device, or the method can be performed by different devices. For example, step S101 and step S102 can be performed by device 1, and step S103 can be performed by device 2. For another example, step S101 can be performed by device 1, and step S102 and step S103 can be performed by device 2.

Figure 2:
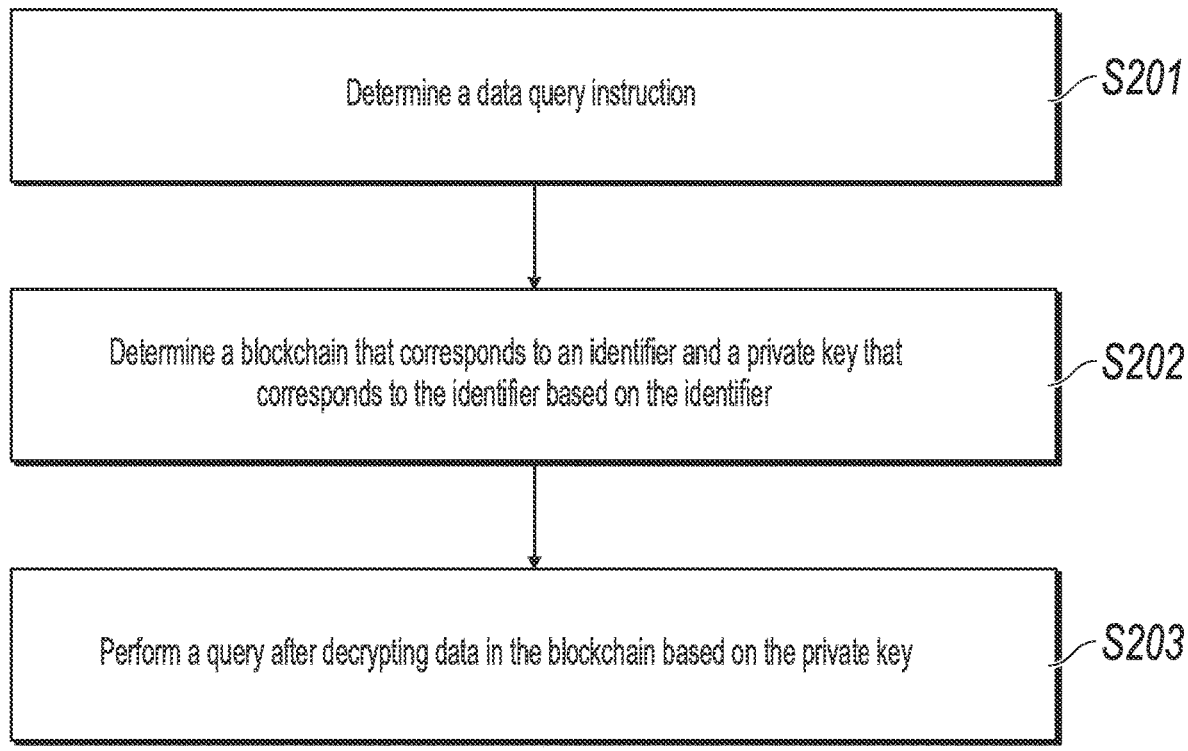
FIG. 2 illustrates a data query process, according to an implementation of the present application.

Based on the data storage process shown in FIG. 1, correspondingly, an implementation of the present application further provides a data query method, as shown in FIG. 2.

FIG. 2 illustrates a data query process, according to an implementation of the present application. The process includes the following steps:

S201: Determine a Data Query Instruction.

In this implementation of the present application, an end-user device can determine a data query instruction, and proceed with a subsequent data query process. The end-user device can be a mobile phone, a tablet computer, a personal computer, a server, etc. and the end-user device can be a single device, or can be a system that includes a plurality of devices. Implementations are not limited in the present application.

The data query instruction can carry an identifier, and is used to subsequently determine a blockchain for querying data. In some implementations, the data query instruction can be generated and determined by the end-user device. In some implementations, the end-user device can receive the data query instruction and determine the data query instruction. There is no limitation on a way to generating the data query instruction in the present application, provided that the end-user device can determine the data query instruction.

It is worthwhile to note that, in the present application, an execution body (that is, the end-user device) in the data query process shown in FIG. 2 can be different from an execution body in the data storage process shown in FIG. 1. For distinguishing, in the subsequent description, a query device represents an end-user device that executes the data query process, and a storage device represents an end-user device that executes the data storage process.

S202: Determine a Blockchain that Corresponds to an Identifier and a Private Key that Corresponds to the Identifier Based on the Identifier.

In this implementation of the present application, because the query device only needs to query the data that corresponds to the identifier, the query device can determine the blockchain that corresponds to the identifier and the private key that corresponds to the identifier based on the identifier.

In this implementation of the present application, the query device can determine the private key based on the pre-stored mapping relationship between the identifier and the private key in the key pair. Alternatively, when the private key that corresponds to the identifier is not pre-stored in the query device, the query device can further send a private key acquisition request to the specified end-user device (that is, the storage device) in FIG. 1, and receive the returned private key. The private key acquisition request can carry the device identifier of the query device and the identifier, so that the storage device can determine the private key in the key pair based on the identifier, and determine to return the private key to the query device by using the device identifier.

In addition, data that corresponds to the identifier is stored in a blockchain that corresponds to the identifier. Therefore, in the present application, the query device can further determine the blockchain that corresponds to the identifier in the blockchain network storage node based on the identifier, to proceed with a subsequent data query operation.

The query device can search the blockchain network storage node based on the identifier for the blockchain that corresponds to the identifier, and determine the blockchain. If a blockchain that corresponds to the identifier is not identified in the blockchain network storage node, the query device can indicate an error and display query error information.

S203: Perform a Query after Decrypting Data in the Blockchain Based on the Private Key.

In this implementation of the present application, after determining the private key, the query device can query the data based on the determined blockchain and the private key that correspond to the identifier.

The query device can first determine, from a blockchain network storage node, each encrypted data packet that corresponds to the identifier in the blockchain, determine the recently stored encrypted data packet as the encrypted data packet that corresponds to the identifier based on a time sequence of storing each encrypted data packet (that is, based on a time sequence of time stamps carried in encrypted data packets), decrypt the encrypted data packet based on the private key after retrieving the encrypted data packet that corresponds to the identifier, to obtain all data that corresponds to the identifier, and finally query all the data based on the data query instruction.

Because the query device only has a private key that corresponds to the identifier, the query device can only decrypt an encrypted data packet that corresponds to the identifier, but cannot encrypt the encrypted data packet. As such, the query device cannot store the data in the blockchain after updating the data that corresponds to the identifier, thereby ensuring security of storing the data in the blockchain.

In addition, when determining each encrypted data packet that corresponds to the identifier from the blockchain network storage node, the end-user device can first determine a generation time of each data block in the blockchain, and determine each encrypted data packet from the most recently generated data block, that is, determine that each encrypted data packet is stored in the most recently generated data block in the blockchain, and proceed with a subsequent operation.

It is worthwhile to note that all the steps of the method provided in the implementations of the present application can be performed by the same device, or the method can be performed by different devices. For example, step S201 and step S202 can be performed by device 1, and step S203 can be performed by device 2. For another example, step S201 can be performed by device 1, and step S202 and step S203 can be performed by device 2.

Figure 3:
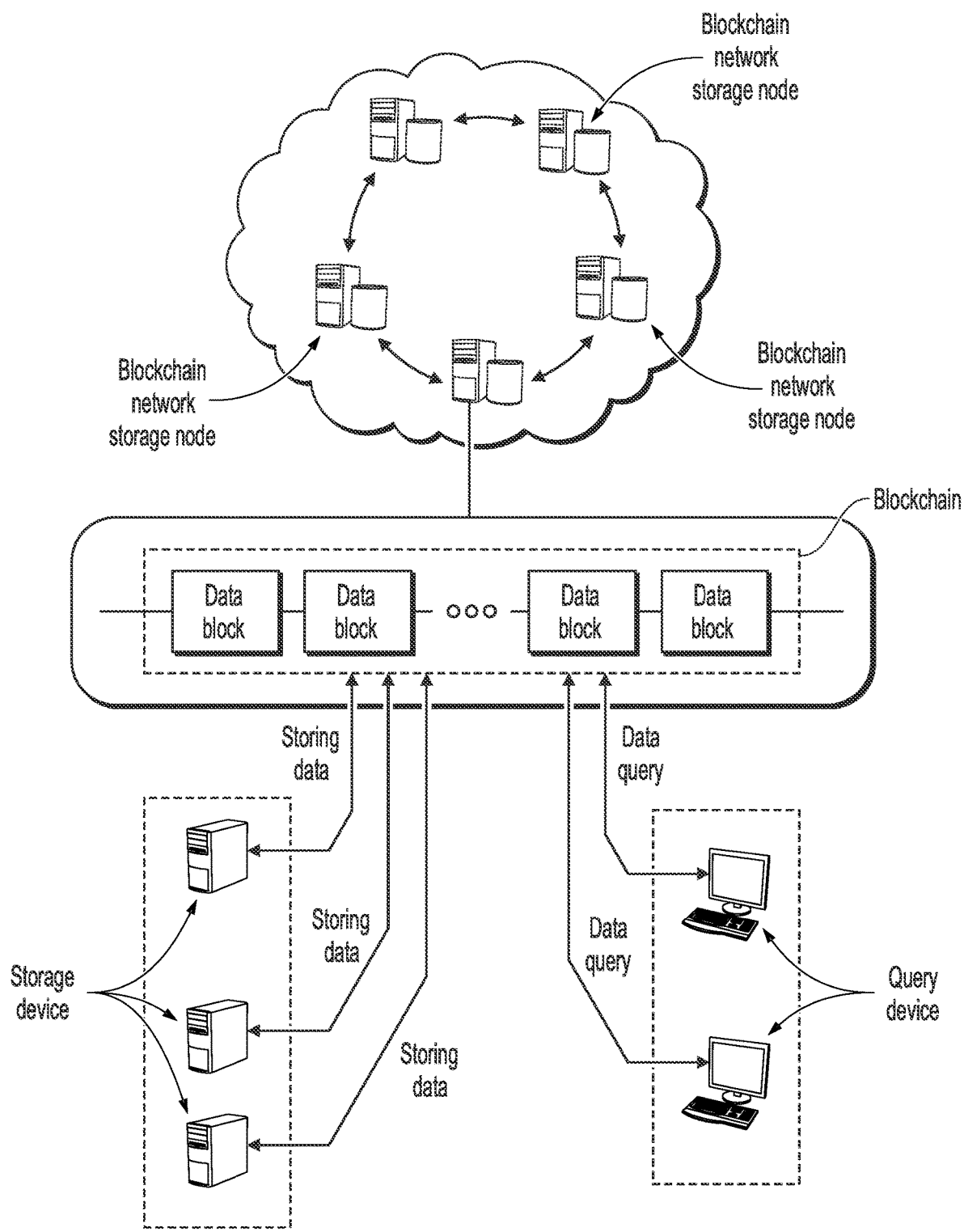
FIG. 3 is a schematic structural diagram illustrating a data access system, according to an implementation of the present application.

Based on the data storage process shown in FIG. 1 and the data query process shown in FIG. 2, correspondingly, a data access system is further provided in this implementation of the present application, as shown in FIG. 3.

FIG. 3 is a schematic structural diagram illustrating a data access system, according to an implementation of the present application. The data access system includes several storage devices, several query devices, and several blockchain network storage nodes.

The blockchain network storage node is configured to store a blockchain that corresponds to an identifier.

The storage device (that is, the storage device shown in FIG. 1 in this implementation of the present application) is configured to determine a data storage instruction, determine the blockchain that corresponds to the identifier and a key pair that corresponds to the identifier based on the identifier carried in the data storage instruction, and store data to be stored in the blockchain that corresponds to the identifier in the blockchain network storage node based on the key pair.

The query device (that is, the query device shown in FIG. 2 in this implementation of the present application) is configured to determine a data query instruction, determine a blockchain that corresponds to the identifier and a private key that corresponds to the identifier based on an identifier carried in the data query instruction, decrypt data in the blockchain by using the private key, and perform a query.

When any storage device in the data access system generates a blockchain that corresponds to the identifier, the storage device that generates the identifier can send the identifier and the key pair that corresponds to the identifier to another specified storage device. In addition, the storage device that generates the identifier can generate the blockchain only in one blockchain network storage node, and the blockchain network storage node can broadcast the blockchain to another blockchain network storage node in the data access system, so that data in all blockchain network storage nodes in the data access system is consistent.

In addition, when determining the private key that corresponds to the identifier, the data query device can send a private key acquisition request to any storage device, to obtain the private key and perform a subsequent data query operation.

Further, in different storage devices in the data access system, pre-stored key pairs that correspond to the identifier can be different from each other, and different key pairs can be used to encrypt data of different types.

Still further, in the data access system, any device can obtain an encrypted data packet that corresponds to the identifier, and perform decryption to obtain data that corresponds to the identifier. Therefore, to ensure security and credibility of data in the blockchain, only the storage device (that is, the device specified by the consortium blockchain network) can encrypt the data that corresponds to the identifier. Therefore, in the data access system, only the encrypted data stored in the blockchain network storage node is credible data. As such, when obtaining the data that corresponds to the identifier by using the blockchain network storage node, the data query device and the storage device can obtain only the encrypted data packet in the blockchain network storage node.

In addition, because there are a plurality of blockchain network storage nodes in the data access system, (in some implementations) to facilitate consistency of stored data, only one of the blockchain network storage nodes can be accessed by each storage device and each data query device. Another blockchain network storage node can be a secondary node. When the blockchain network storage node cannot work normally, the secondary blockchain network storage node is selected to continue to work, and the blockchain network storage node that cannot work normally is replaced with the selected secondary blockchain network storage node. How to enable the secondary blockchain network storage node and how to determine that the working blockchain network storage node does not work properly can be set by a staff based on a situation in practice. Implementations are not limited in the present application. In addition, for preventing a case that a service is not executed properly when a primary device stops working, a technical solution for using the secondary device to replace the primary device is quite mature. Therefore, details are omitted for simplicity in the present application.

Further, in the data access system, the blockchain network storage node and the storage device can be the same. That is, each blockchain network storage node is also a storage device. Alternatively, when a quantity of blockchain network storage nodes in the data access system is inconsistent with a quantity of storage devices, some of the blockchain network storage nodes are also storage devices, and the remaining blockchain network storage nodes are merely blockchain network storage nodes, or some of the storage devices are also blockchain network storage nodes, and the remaining storage devices are merely storage devices.

According to the data access system provided in FIG. 3 in this implementation of the present application, it can be seen that different storage devices can store data of different types that corresponds to the identifier, and data that corresponds to the identifier is stored in a blockchain that corresponds to the identifier. In addition, any data query device can access and retrieve data from the blockchain network storage node so that the data access system in the present application can effectively alleviate an issue of low efficiency and complex operations resulting from storing data in multiple devices.

Figure 4:
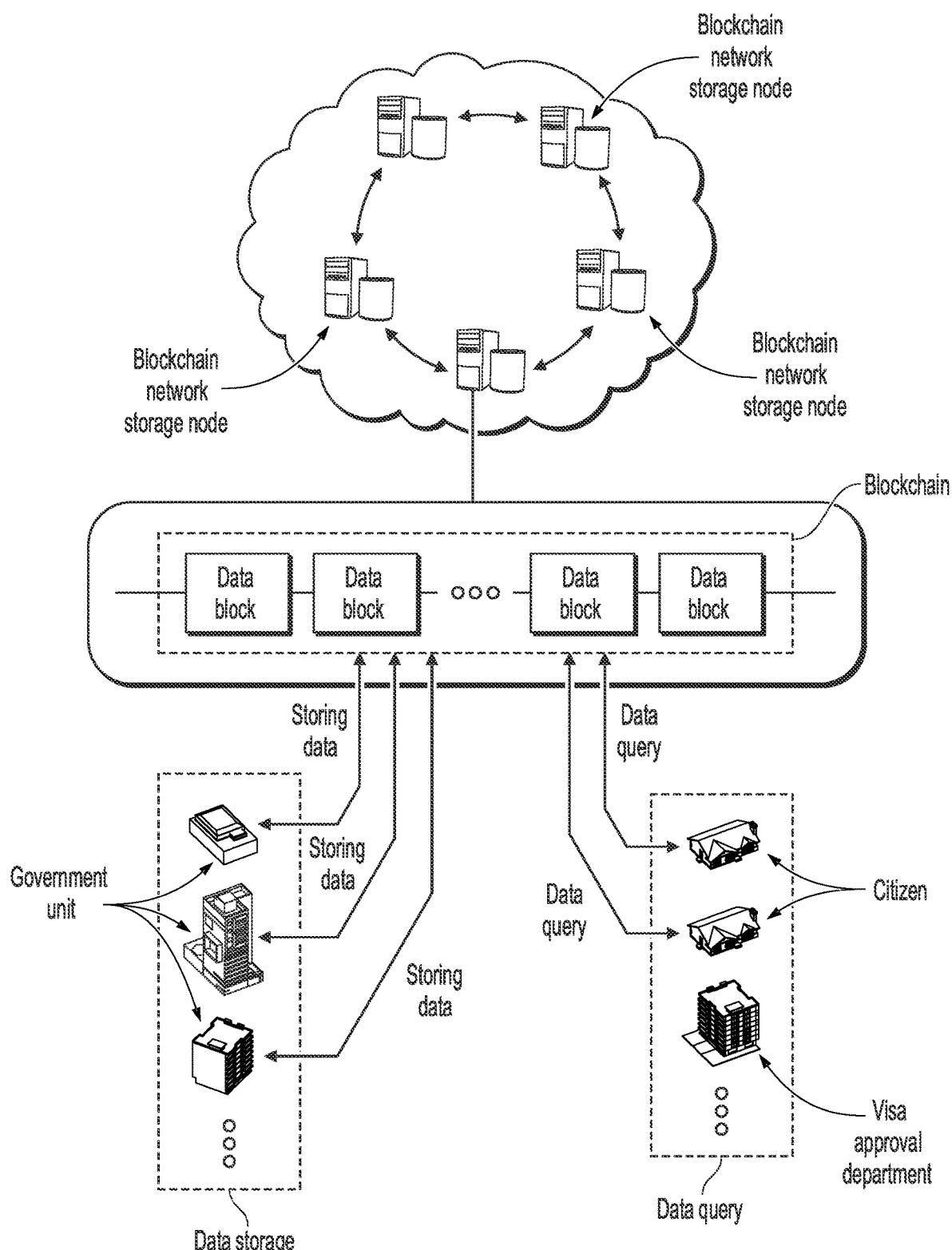
FIG. 4 is a schematic structural diagram illustrating another data access system, according to an implementation of the present application.

In some implementations of the present application, the identifier can be an identity card number of a citizen, the storage device can be a data storage device of a credible unit such as a government department or a government unit, and the data query device can be any device in the society that needs to perform a data query, as shown in FIG. 4. In the present application, the data access can be as shown in FIG. 4. The blockchain network storage node can be a data storage node provided by the government, and all data that corresponds to the citizen identity card number can be file data, credit data, bank account data, etc. of the citizen. Any data related to the citizen can be written into a blockchain that corresponds to the citizen identity card number.

Further, data storage devices of credible units such as different government departments or government units can be used to store data of different types in a blockchain that corresponds to the citizen identity card number. For example, a police department can perform a data storage operation on the crime record, household information, etc. of the citizen, a civil affairs department can perform a data storage operation on the marital status of the citizen, and a bank can perform a data storage operation on the account data and the credit data of the citizen. A specific process can be implemented by using different key pairs in step S102 and FIG. 1.

Still further, the data query device can be a device held by the citizen, or can be a data query device of another government department or company. For example, a visa approval department can send a private key retrieving request to the above-noted government department or government unit, to obtain the key that corresponds to the identity card of the citizen, and to query the information about the citizen. As another example, an employment unit can send a private key retrieving request to the government department or the government unit, to obtain the private key that corresponds to the identity card of the citizen, and to query the information about the citizen.

In addition, in another implementation of the present application, the storage device can be storage devices that separately correspond to a plurality of companies or units that have a consortium relationship, for example, a storage device that corresponds to a car rental company, a bank, or a transportation management authority. The query device can be an end-user device held by a driver or an end-user device held by a traffic policeman. As such, because all data that corresponds to the citizen can be stored in the blockchain, there is no need to create a special query system, and according to the data access system described in FIG. 4, it can be convenient to check a vehicle and a driver on the road.

Figure 5:
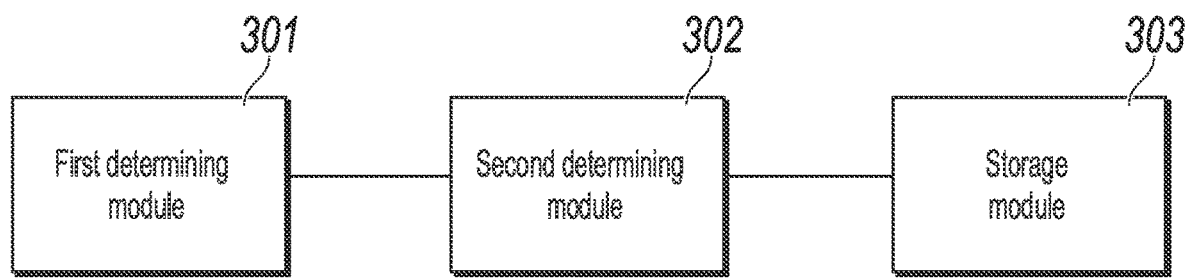
FIG. 5 is a schematic structural diagram illustrating a data storage apparatus, according to an implementation of the present application.

Based on the data storage process shown in FIG. 1, correspondingly, an implementation of the present application further provides a data storage apparatus, as shown in FIG. 5.

FIG. 5 is a schematic structural diagram illustrating a data storage apparatus, according to an implementation of the present application. The apparatus includes the following: a first determining module 301, configured to determine a data storage instruction, where the data storage instruction carries an identifier and data to be stored; a second determining module 302, configured to determine a blockchain that corresponds to the identifier and a key pair that corresponds to the identifier based on the identifier; and a storage module 303, configured to store the data to be stored in the blockchain based on the key pair.

The storage module 303 stores the data to be stored in the most recently generated data block in the blockchain.

The second determining module 302 determines whether a blockchain that corresponds to the identifier exists in a blockchain network storage node based on a pre-stored mapping relationship between the identifier and each of the key pair and the blockchain; in response to determining that the blockchain that corresponds to the identifier exists in the blockchain network storage node, determines a blockchain that corresponds to the identifier and a key pair that corresponds to the identifier in the blockchain network storage node; and in response to determining that the blockchain that corresponds to the identifier does not exist in the blockchain network storage node, generates a blockchain that corresponds to the identifier and a key pair that corresponds to the identifier.

When the second determining module 302 determines that a blockchain that corresponds to the identifier exists, the storage module 303 retrieves, from the blockchain network storage node, an encrypted data packet that corresponds to the identifier in the blockchain; decrypts the encrypted data packet by using a private key in the key pair to obtain all data that corresponds to the identifier in the encrypted data packet; updates all the data that corresponds to the identifier in the encrypted data packet based on the data to be stored, to obtain updated data; encrypts the updated data as an updated encrypted data packet by using a public key in the key pair; adds a time stamp to the updated encrypted data packet and stores the updated encrypted data packet and the time stamp in the blockchain; and stores, in the blockchain network storage node, the blockchain that stores the updated encrypted data packet and the time stamp.

When the second determining module 302 determines that a blockchain that corresponds to the identifier does not exist, the storage module 303 generates initial data that corresponds to the identifier based on the identifier; updates the initial data based on the data to be stored to updated data; generates the key pair that corresponds to the identifier, and encrypts the updated data as an encrypted data packet that corresponds to the identifier by using a public key in the key pair; generates the blockchain that corresponds to the identifier, and stores the encrypted data packet in the blockchain; and stores, in the blockchain network storage node, the blockchain that stores the updated encrypted data packet.

The second determining module 302 sends the generated key pair that corresponds to the identifier and the identifier to each predetermined device.

The data storage apparatus shown in FIG. 5 can be located in an end-user device. The end-user device can be a mobile phone, a tablet computer, etc., or the data storage apparatus can be located in a server. The server can be a separate device or a system that includes a plurality of devices, that is, a distributed server.

Figure 6:
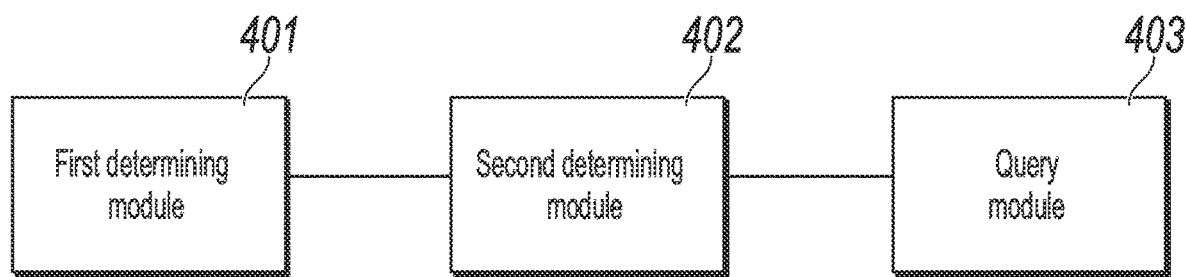
FIG. 6 is a schematic structural diagram illustrating another data query apparatus, according to an implementation of the present application.

Based on the data query process shown in FIG. 2, correspondingly, an implementation of the present application provides a data query apparatus, as shown in FIG. 6.

FIG. 6 is a schematic structural diagram illustrating a data query apparatus, according to an implementation of the present application. The apparatus includes the following: a first determining module 401, configured to determine a data query instruction, where the data query instruction carries an identifier; a second determining module 402, configured to determine a blockchain that corresponds to the identifier and a private key that corresponds to the identifier, based on the identifier; and a query module 403, configured to perform a query after decrypting data in the blockchain based on the private key.

The second determining module 402 determines the private key based on a pre-stored mapping relationship between the identifier and a private key in a key pair, or sends a private key acquisition request to a specified device based on the identifier, and receives the returned private key.

The query module 403 determines, from a blockchain network storage node, each encrypted data packet that corresponds to the identifier in the blockchain; determines a most recently stored encrypted data packet based on a time sequence of storing the encrypted data packets, as an encrypted data packet that corresponds to the identifier; and performs a query after decrypting the encrypted data packet based on the private key.

The data query apparatus shown in FIG. 6 can be located in an end-user device. The end-user device can be a mobile phone, a tablet computer, etc., or the data storage apparatus can be located in a server. The server can be a separate device or a system that includes a plurality of devices, that is, a distributed server.

A person skilled in the art would understand that an implementation of the present invention can be provided as a method, a system, or a computer program product. Therefore, the present invention can use a form of hardware only implementations, software only implementations, or implementations with a combination of software and hardware. Moreover, the present invention can use a form of a computer program product that is implemented on one or more computer-usable storage media (including but not limited to a disk memory, a CD-ROM, an optical memory, etc.) that include computer-usable program code.

The present invention is described with reference to the flowcharts and/or block diagrams of the method, the device (system), and the computer program product based on the implementations of the present invention. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), random access memory (RAM), a read-only memory (ROM), an electrically erasable programmable read-only memory (EEPROM), a flash memory or another memory technology, a compact disc read-only memory (CD-ROM), a digital versatile disc (DVD) or an optical storage, a cassette magnetic tape, a magnetic tape/magnetic disk storage or a magnetic storage device. The computer storage medium can be used to store information accessible by the calculating device. Based on the definition in the present specification, the computer readable medium does not include transitory computer readable media (transitory media) such as a modulated data signal and carrier.

It is worthwhile to further note that, the terms "include", "contain", or their other variants are intended to cover a non-exclusive inclusion, so a process, a method, a product or a device that includes a list of elements not only includes those elements but also includes other elements which are not expressly listed, or further includes elements inherent to such a process, method, product or device. Without more constraints, an element preceded by "includes a . . . " does not preclude the existence of additional identical elements in the process, method, product or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The implementations described herein are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 7:
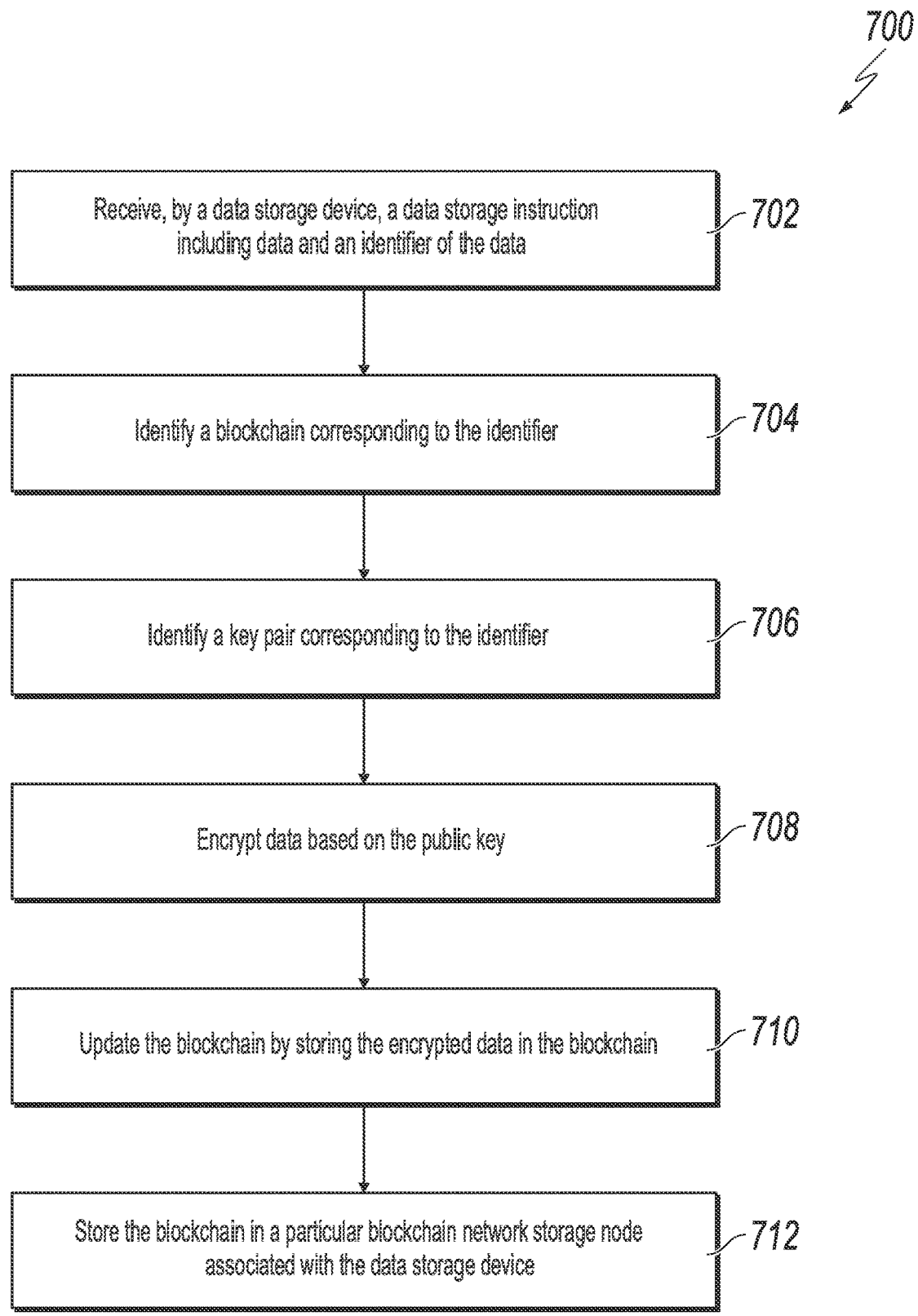
FIG. 7 is a flowchart illustrating an example of a computer-implemented method of storing data, according to an implementation of the present disclosure.

FIG. 7 is a flowchart illustrating an example of a computer-implemented method 700 of storing data, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a data storage device receives an instruction to store data. The instruction includes data to be stored and an identifier of the data. The data storage device may receive the storage instruction from a user or from another computing device that communicates with the data storage device. The data storage device is part of a data access system, for example, the system illustrated in FIG. 3. From 702, method 700 proceeds to 704.

At 704, the data storage device identifies (or determines) a blockchain corresponding to the identifier received at 702. The blockchain is stored on a plurality of blockchain network storage nodes of the data access system. FIG. 3 illustrates blockchain network storage nodes (or "blockchain storage nodes") in an example data access system. In the illustrated example, the blockchain storage nodes differ from the data storage devices. In some implementations, one or more data storage devices can also function as respective blockchain network storage nodes. From 704, method 700 proceeds to 706.

At 706, the data storage device identifies (or determines) a key pair corresponding to the identifier retrieved at 702. The key pair includes a public key and a private key. The key pair can be identified, for example, by searching a stored data that contains mapping relationship between the one or more identifiers and one or more key pairs. Such data may be stored on a data storage device, a blockchain network storage node, a third-party computing device, or a combination of these. From 706, method 700 proceeds to 708.

At 708, the data storage device encrypts the data received at 702, by using the public key of the key pair. From 708, method 700 proceeds to 710.

At 710, the blockchain (identified at 704) is updated to store the encrypted data. In some implementations, the encrypted data is stored in a most-recently created (or updated) block of the blockchain. For example, each block of the blockchain may store a time stamp that indicates when the block was created (or updated). From 710, method 700 proceeds to 712.

At 712, the blockchain is stored on a particular blockchain network storage node associated with the data storage device. The data storage device may be in communication with one or more blockchain network storage nodes in the blockchain network storage nodes of the data access system. At 712, the storage device sends the updated blockchain to a particular blockchain node from among the blockchain network storage nodes of the data access system that are in communication with the data storage device. Since the storage device stores the data on only one blockchain node, data storage is faster in the present implementations than in conventional distributed storage systems.

The particular blockchain node may broadcast the updated blockchain to other blockchain network storage nodes of the data access system so that the updated blockchain is stored on multiple blockchain network storage nodes. By storing (or copying) the blockchain on multiple nodes, the data is protected from being lost even if one or more of the blockchain nodes malfunction or attacked.

In some implementations, data included in the identified blockchain is encrypted. Such a blockchain is updated by decrypting its data, updating part of the blockchain that is related to the data-to-be-stored, and encrypting the blockchain data. For example, the identified blockchain can be retrieved (for example, from the particular blockchain) and the encrypted data stored in the blockchain can be decrypted by using the private key of the identified key pair. The data (of the blockchain) that corresponds to the identifier is then updated based on the data to be stored, and is consequently stored in the blockchain. In some implementations, only encrypted data associated with the identifier (rather than the whole data of the blockchain) is decrypted.

In some implementations, a time stamp is also stored in the blockchain to track a record of the updates on the blockchain. The time stamp may be added to the updated encrypted data.

The blockchain associated with the identifier can be identified or determined (704), for example, by searching a stored data that contains mapping relationship between one or more identifiers and one or more blockchains. Such data may be stored on a data storage device, a blockchain network storage node, or both. In case the storage device determines that no blockchain is mapped to the identifier, the storage device generates a blockchain for storing the data, and associates the generated blockchain to the identifier. The storage device may also generate (or request and receive from another computing device) a key pair and associate the key pair to the identifier.

A blockchain may be generated by generating initial data based on the identifier, updating the initial data based on the data to be stored, generating (or receiving) a key pair that corresponds to the identifier, encrypting the updated data as an encrypted data packet that corresponds to the identifier by using the public key in the key pair, and storing the encrypted data packet in the generated blockchain. The initial data may include information about properties of the generated blockchain such as date of creation, size, the creating device, etc. Updating the initial data may include adding the data-to-be-stored, or replacing (at least part of) the former with the latter. The generated blockchain is stored on one or more blockchain network storage nodes (e.g., the particular blockchain node described above) of the data access system. In addition, the key pair (along with the identifier) may be sent to one or more predetermined devices that store one or more key pairs so that in later inquiries the key pair can be retrieved from those predetermined devices by providing the identifier.

The data access system described herein can include one or more query devices configured to query data stored on the blockchain network storage nodes. FIG. 3 illustrates query devices in an example data access system. A query device may also be a storage device, or may be just a query device incapable (or unauthorized) to store data on the blockchain network storage nodes. The data access system may be a consortium blockchain that allows only the data storage devices (and not the query devices) to store data on the blockchain nodes.

A query device may receive an instruction to query a data, for example, from a user or from another computing device. The instruction includes a data identifier of the data to be queried. The query device identifies (or determines) a blockchain that corresponds to the data identifier, for example, by communicating with a storage device that keeps a relationship map between data identifiers and the blockchains. Alternatively, or in addition, the query device may store such mapping relationship and may not need to retrieve it from the storage device. The query device requests and retrieves the identified blockchain from the blockchain network storage nodes.

The query device then decrypts data of the retrieved blockchain based on a private key associated with the data identifier, and queries the decrypted data. In some implementations, the query device receives the private key from a computing device that stores mapping relationships between one or more data identifiers and one or more key pairs, where each key pair includes a respective public and a respective private key. In some implementations, the mapping relationship in stored on the query device.

In some implementations, the query device determines a most recently stored encrypted data packet (or a most recently block) or the identified blockchain, and decrypts only this most recently data packet (or block) instead of decrypting all data of the blockchain.

Implementations of the present disclosure include computer-implemented methods to perform actions for storing data and efficient retrieval of the stored data. In some implementations, actions include receiving a data storage instruction including data to be stored and an identifier of the data, identifying a blockchain corresponding to the identifier, the blockchain being stored on blockchain network storage nodes of a data access system, identifying a key pair corresponding to the identifier, the key pair comprising a private key and a public key, encrypting the data based on the public key to provide encrypted data; updating the blockchain by storing the encrypted data in the blockchain, and storing the updated blockchain in a particular blockchain network storage node of the blockchain network storage nodes, the particular blockchain network storage node being associated with the data storage device.

These and other implementations may each optionally include one or more of the following features: the encrypted data is stored in a most-recently created block of the blockchain; the storage device is different from the blockchain network storage nodes and communicates with only the particular blockchain network storage node from among the blockchain network storage nodes for storing data; the actions further include broadcasting, by the particular blockchain network storage node, the updated blockchain to other blockchain network storage nodes of the data access system; updating the blockchain include retrieving, from the particular blockchain network storage node, an encrypted data packet stored in the blockchain, decrypting the encrypted data packet by using the private key in the key pair to obtain all data that corresponds to the identifier in the encrypted data packet, updating data that corresponds to the identifier in the encrypted data packet based on the data to be stored, to obtain updated data, encrypting the updated data as an updated encrypted data packet by using the public key in the key pair, adding a time stamp to the updated encrypted data packet, and storing the updated data packet and the time stamp in the blockchain; the key pair is identified by searching a stored data that contains mapping relationship between the one or more identifiers and one or more key pairs.

In some implementations, the blockchain is identified by searching a stored data that contains mapping relationship between one or more identifiers and one or more blockchains. In some examples, the actions further include: in response to determining that no blockchain is mapped to the identifier, generating the blockchain, and associating the blockchain to the identifier and a key pair associated with the identifier. In some examples, the actions further include: generating initial data based on the identifier, updating the initial data based on the data to be stored, generating the key pair that corresponds to the identifier, encrypting the updated data as an encrypted data packet that corresponds to the identifier by using the public key in the key pair, storing the encrypted data packet in the generated blockchain, and storing the blockchain in the particular blockchain network storage node. The actions can further include sending the generated key pair that corresponds to the identifier to one or more predetermined devices that store one or more key pairs.

In some implementations, the blockchain is a first blockchain, and the actions further include: receiving, by a data query device, a data query instruction including a data identifier; identifying a second blockchain that corresponds to the data identifier, the second blockchain being stored in the blockchain network storage nodes; retrieving, from a node of the blockchain network storage nodes, the second blockchain; decrypting data of the second blockchain based on a private key associated with the data identifier; and querying, by the data query device, the decrypted data. In some examples, the actions further include: sending, by the data query device, a private key acquisition request to a computing device that stores a mapping relationship between one or more data identifiers and one or more key pairs, the private key acquisition including the data identifier; and receiving the private key associated with the data identifier. Decrypting data of the second blockchain can include: determining a most recently stored encrypted data packet in the blockchain based on a time sequence of storing the encrypted data packets; and decrypting only the most recently stored encrypted data packet.

The present disclosure also provides one or more non-transitory computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The disclosure also provides a computer-implemented data access system that including: one or more blockchain network storage nodes, nodes of the one or more blockchain network storage nodes storing one or more blockchains of data, each blockchain being associated to a respective identifier; and one or more data storage devices, each data storage device being configured to: receive a data storage instruction that comprises data to be stored and an identifier, determine a first blockchain and a first key pair associated with the identifier, encrypt data based on a public key in the first key pair, and store the encrypted data in the first blockchain network storage nodes, each data storage device storing the encrypted data in a respective blockchain network storage node associated with the storage device; and one or more query devices, each query device being configured to: receive a data query instruction that comprises a data identifier, determine a second blockchain and a second key pair that corresponds to the data identifier, retrieve data of the second blockchain from the one or more blockchain network nodes, decrypt the retrieved data based on a public key of the second key pair, and query the decrypted data.

These and other implementations may each optionally include one or more of the following features: at least one of the data storage devices is configured to: in response to determining that no blockchain associated with the identifier is stored in the blockchain network storage nodes, generate the first blockchain and associated the identifier with the generated first blockchain; at least one of the query devices is configured to: receive, from a blockchain network storage node, each encrypted data packet that corresponds to the data identifier in the second blockchain; and determine a most recently stored encrypted data packet in the second blockchain based on a time sequence of storing encrypted data packets in the second blockchain, wherein the query device decrypts only the most recently stored encrypted data packet.

Among other advantages, the implementations disclosed herein provide the following technical solutions to technical issues. The implementations improve security and efficiency in storing and retrieving data. Conventionally, data is stored on a centralized system, where a central database stores data and other computer devices in the system retrieve the data from the central database. Regardless of how secure the central database is, a centralized system is considered a high-risk system because as soon as the central database is hacked, all data can be at risk of being lost or manipulated by unauthorized users. Distributed storage systems reduce such risks by distributing the data among multiple computing devices, rather than on a single database. However, to retrieve data from a distributed system, one may need to retrieve the data from multiple devices, which can be slow and inefficient. Implementations of the present disclosure resolve the above-identified security and efficiency issues by storing data on a network of blockchain nodes.

The data security is improved because data is stored on multiple devices rather than on a single database. Thus, even if one of the storage devices is attacked, the data is secured on the other storage devices and is protected from being manipulated. In addition, the stored data cannot be manipulated or updated except through particular authorized devices (referred herein as "data storage devices").

Data retrieving (e.g., data query) efficiency is improved because contrary to distributed storage systems, there is no need to access a plurality of databases to retrieve the data. Rather, data can be retrieved by identifying a blockchain that includes the data, through an identifier of the data, and by communicating with a single blockchain node to retrieve the identified blockchain. Data storage process is also improved as compared to distributed systems because each data storage device needs to store an updated blockchain on only a single blockchain node, rather than on multiple storage devices. Once the data is stored on a node of a network of blockchain nodes, the node communicates with other blockchain nodes on the network so that the updated blockchain gets stored on multiple blockchain nodes (for security purposes and to ensure avoiding loss of data upon a blockchain node malfunction).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented data storage method, comprising:
   receiving, by a data storage device, a data storage instruction including data to be stored and an identifier of the data;
   identifying a blockchain corresponding to the identifier, the blockchain being stored on blockchain network storage nodes of a data access system, wherein the blockchain is a first blockchain, and wherein the computer-implemented data storage method further comprises:
      receiving, by a data query device, a data query instruction including a data identifier;
      identifying a second blockchain that corresponds to the data identifier, the second blockchain being stored in the blockchain network storage nodes;
      retrieving, from a node of the blockchain network storage nodes, the second blockchain;
      decrypting data of the second blockchain based on a private key associated with the data identifier; and
      querying, by the data query device, the data;
   identifying a key pair corresponding to the identifier, the key pair comprising a private key and a public key;
   encrypting the data based on the public key to provide encrypted data;
   updating the blockchain by storing the encrypted data in the blockchain, wherein updating the first blockchain comprises:
      retrieving, from the particular blockchain network storage node, an encrypted data packet stored in the first blockchain;

decrypting the encrypted data packet by using the private key in the key pair to obtain all data that corresponds to the identifier in the encrypted data packet;

updating data that corresponds to the identifier in the encrypted data packet based on the data to be stored, to obtain updated data;

encrypting the updated data as an updated encrypted data packet by using the public key in the key pair;

adding a time stamp to the updated encrypted data packet; and storing the updated encrypted data packet and the time stamp in the first blockchain; and storing the first blockchain in a particular blockchain network storage node of the blockchain network storage nodes, the particular blockchain network storage node associated with a data storage device.

2. The computer-implemented data storage method of claim 1, wherein the encrypted data is stored in a most-recently created block of the blockchain.

3. The computer-implemented data storage method of claim 1, wherein the data storage device is different from the blockchain network storage nodes and communicates with only the particular blockchain network storage node from among the blockchain network storage nodes for storing data.

4. The computer-implemented data storage method of claim 1, further comprising broadcasting, by the particular blockchain network storage node, the blockchain to other blockchain network storage nodes of the data access system.

5. The computer-implemented data storage method of claim 1, wherein the blockchain is identified by searching a stored data that contains mapping relationship between one or more identifiers and one or more blockchains.

6. The computer-implemented data storage method of claim 5, further comprising in response to determining that no blockchain is mapped to the identifier,
generating the blockchain; and
associating the blockchain to the identifier and a key pair associated with the identifier.

7. The computer-implemented data storage method of claim 6, further comprising:
generating initial data based on the identifier;
updating the initial data based on the data to be stored;
generating the key pair that corresponds to the identifier;
encrypting the initial data as an encrypted data packet that corresponds to the identifier by using the public key in the key pair;
storing the encrypted data packet in the blockchain; and
storing the blockchain in the particular blockchain network storage node.

8. The computer-implemented data storage method of claim 7, further comprising sending the key pair that corresponds to the identifier to one or more predetermined devices that store one or more key pairs.

9. The computer-implemented data storage method of claim 1, wherein the key pair is identified by searching stored data that contains a mapping relationship between one or more identifiers and one or more key pairs.

10. The computer-implemented data storage method of claim 1, further comprising:
sending, by the data query device, a private key acquisition request to a computing device that stores a mapping relationship between one or more data identifiers and one or more key pairs, the private key acquisition request including the data identifier; and receiving the private key associated with the data identifier.

11. The computer-implemented data storage method of claim 1, wherein decrypting data of the second blockchain comprises:
determining a most recently stored encrypted data packet in the blockchain based on a time sequence of storing encrypted data packets; and
decrypting only the most recently stored encrypted data packet.

12. A computer-implemented data access system, comprising:
one or more blockchain network storage nodes, nodes of the one or more blockchain network storage nodes storing one or more blockchains of data, each blockchain being associated to a respective identifier; and
one or more data storage devices, each data storage device being configured to:
receive a data storage instruction that comprises data to be stored and an identifier,
determine a first blockchain and a first key pair associated with the identifier,
encrypt data based on a public key in the first key pair, and
store the encrypted data in network storage nodes of the first blockchain to update the first blockchain, each data storage device storing the encrypted data in a respective blockchain network storage node associated with a storage device, wherein the storing comprises:
retrieving, from the respective blockchain network storage node, an encrypted data packet stored in the first blockchain;
decrypting the encrypted data packet by using a private key in the first key pair to obtain all data that corresponds to the identifier in the encrypted data packet;
updating data that corresponds to the identifier in the encrypted data packet based on the data to be stored, to obtain updated data;
encrypting the updated data as an updated encrypted data packet by using the public key in the first key pair;
adding a time stamp to the updated encrypted data packet; and
storing the updated encrypted data packet and the time stamp in the first blockchain; and
one or more query devices, each query device configured to:
receive a data query instruction that comprises a data identifier,
determine a second blockchain and a second key pair that corresponds to the data identifier,
retrieve data of the second blockchain from the one or more blockchain network storage nodes,
decrypt the data based on a public key of the second key pair, and
query the data.

13. The computer-implemented data access system of claim 12, wherein at least one of the data storage devices is configured to:
in response to determining that no blockchain associated with the identifier is stored in the blockchain network storage nodes, generate the first blockchain and associated the identifier with the first blockchain.

14. The computer-implemented data access system of claim 12, wherein at least one of the query devices is configured to:
- receive, from a blockchain network storage node, each encrypted data packet that corresponds to the data identifier in the second blockchain; and
- determine a most recently stored encrypted data packet in the second blockchain based on a time sequence of storing encrypted data packets in the second blockchain, wherein the at least one of the query devices decrypts only the most recently stored encrypted data packet.

15. A non-transitory computer-readable medium storing one or more instructions executable by a computer system to perform operations comprising:
- receiving a data storage instruction including data to be stored and an identifier of the data;
- identifying a blockchain corresponding to the identifier, the blockchain stored on blockchain network storage nodes of a data access system, wherein the blockchain is a first blockchain, and the operations further comprise:
  - receiving, by a data query device, a data query instruction including a data identifier;
  - identifying a second blockchain that corresponds to the data identifier, the second blockchain stored in the blockchain network storage nodes;
  - retrieving, from a node of the blockchain network storage nodes, the second blockchain;
  - decrypting data of the second blockchain based on a private key associated with the data identifier; and
  - querying, by the data query device, the data;
- identifying a key pair corresponding to the identifier, the key pair comprising a private key and a public key;
- encrypting the data based on the public key to provide encrypted data;
- updating the first blockchain by storing the encrypted data in the first blockchain, wherein updating the first blockchain comprises:
  - retrieving, from the blockchain network storage node, an encrypted data packet stored in the first blockchain;
  - decrypting the encrypted data packet by using the private key in the key pair to obtain all data that corresponds to the identifier in the encrypted data packet;
  - updating data that corresponds to the identifier in the encrypted data packet based on the data to be stored, to obtain updated data;
  - encrypting the updated data as an updated encrypted data packet by using the public key in the key pair;
  - adding a time stamp to the updated encrypted data packet; and
  - storing the updated encrypted data packet and the time stamp in the first blockchain; and
- storing the first blockchain in a blockchain network storage node of the blockchain network storage nodes, the blockchain network storage node associated with a data storage device.

16. The non-transitory computer-readable medium of claim 15, wherein the blockchain is identified by searching a stored data that contains mapping relationship between one or more identifiers and one or more blockchains, and the operations further comprise:
- in response to determining that no blockchain is mapped to the identifier, generating the blockchain, and associating the blockchain to the identifier and a key pair associated with the identifier.

* * * * *